(12) United States Patent
Blomqvist et al.

(10) Patent No.: US 8,904,865 B2
(45) Date of Patent: Dec. 9, 2014

(54) VIBRATING MICRO-MECHANICAL SENSOR OF ANGULAR VELOCITY

(75) Inventors: Anssi Blomqvist, Helsinki (FI); Jaakko Ruohio, Helsinki (FI)

(73) Assignee: Murata Electronics Oy, Vantaa (FI)

( * ) Notice: Subject to any disclaimer, the term of this patent is extended or adjusted under 35 U.S.C. 154(b) by 250 days.

(21) Appl. No.: 12/715,767

(22) Filed: Mar. 2, 2010

(65) Prior Publication Data
US 2010/0218605 A1 Sep. 2, 2010

(30) Foreign Application Priority Data

Mar. 2, 2009 (FI) .................................. 20095201
Sep. 2, 2009 (FI) .................................. 20095903

(51) Int. Cl.
*G01C 19/56* (2012.01)
*G01C 19/5747* (2012.01)

(52) U.S. Cl.
CPC .................. *G01C 19/5747* (2013.01)
USPC .................. 73/504.12; 73/504.14

(58) Field of Classification Search
USPC ............... 73/504.12, 504.14, 504.16, 504.02, 73/504.04
See application file for complete search history.

(56) References Cited

U.S. PATENT DOCUMENTS

| | | | | |
|---|---|---|---|---|
| 5,635,638 | A * | 6/1997 | Geen ........................... | 73/504.04 |
| 5,728,936 | A * | 3/1998 | Lutz ............................ | 73/504.14 |
| 5,920,012 | A | 7/1999 | Pinson | |
| 6,067,858 | A * | 5/2000 | Clark et al. ................. | 73/504.16 |
| 6,122,961 | A | 9/2000 | Geen et al. | |
| 6,250,156 | B1 * | 6/2001 | Seshia et al. ............... | 73/504.12 |
| 6,467,348 | B1 * | 10/2002 | Song et al. .................. | 73/504.12 |
| 6,520,015 | B1 | 2/2003 | Alause et al. | |
| 6,742,390 | B2 * | 6/2004 | Mochida et al. ........... | 73/504.14 |
| 6,752,017 | B2 * | 6/2004 | Willig et al. ............... | 73/504.04 |
| 6,807,858 | B2 * | 10/2004 | Orsier ......................... | 73/504.12 |
| 6,843,127 | B1 * | 1/2005 | Chiou .......................... | 73/504.12 |
| 6,860,151 | B2 * | 3/2005 | Platt et al. .................. | 73/504.16 |
| 6,892,575 | B2 * | 5/2005 | Nasiri et al. ............... | 73/504.12 |
| 7,036,372 | B2 * | 5/2006 | Chojnacki et al. ......... | 73/504.12 |
| 7,043,985 | B2 * | 5/2006 | Ayazi et al. ................ | 73/504.04 |
| 7,191,653 | B2 * | 3/2007 | Park et al. .................. | 73/504.12 |
| 7,210,347 | B2 * | 5/2007 | Nicu et al ................... | 73/504.12 |

(Continued)

FOREIGN PATENT DOCUMENTS

| | | |
|---|---|---|
| JP | 09-119942 A | 6/1997 |
| JP | 2006-515928 A | 6/2006 |

(Continued)

OTHER PUBLICATIONS

International Search Report application No. PCT/FI2010/050160 filed Mar. 1, 2010.

(Continued)

*Primary Examiner* — Helen Kwok
(74) *Attorney, Agent, or Firm* — Squire Patton Boggs (US) LLP (57) ABSTRACT

The invention relates to measuring devices used for measuring angular velocity, and more precisely, to vibrating micromechanical sensors of angular velocity. The sensor of angular velocity according to the invention comprises at least two seismic mass structures (1), (2), excitation structures (3), (4) and coupling seesaw type springs (6), (7). The objective of the invention is to provide an improved sensor structure, which enables reliable measuring with good efficiency particularly in small vibrating micro-mechanical angular velocity sensor solutions.

5 Claims, 5 Drawing Sheets

(56) References Cited

U.S. PATENT DOCUMENTS

| | | | |
|---|---|---|---|
| 7,267,004 B2* | 9/2007 | Leverrier et al. | 73/504.12 |
| 7,316,161 B2* | 1/2008 | Willig et al. | 73/504.12 |
| 7,340,954 B2* | 3/2008 | Handrich | 73/504.04 |
| 7,347,094 B2* | 3/2008 | Geen et al. | 73/504.12 |
| 7,617,728 B2* | 11/2009 | Cardarelli | 73/504.16 |
| 7,631,558 B2* | 12/2009 | Diem | 73/504.12 |
| 7,707,886 B2* | 5/2010 | Rougeot et al. | 73/504.12 |
| 8,011,244 B2* | 9/2011 | Diem | 73/504.12 |
| 8,061,201 B2* | 11/2011 | Ayazi et al. | 73/504.12 |
| 8,104,364 B2* | 1/2012 | Chaumet | 74/5.46 |
| 8,365,595 B2* | 2/2013 | Geiger et al. | 73/504.14 |
| 2004/0154400 A1 | 8/2004 | Johnson et al. | |
| 2004/0250620 A1 | 12/2004 | Nicu et al. | |
| 2005/0024527 A1* | 2/2005 | Chiou | 348/373 |
| 2006/0010978 A1* | 1/2006 | Lee et al. | 73/504.02 |
| 2006/0156814 A1* | 7/2006 | Blomqvist | 73/504.12 |
| 2008/0150554 A1 | 6/2008 | Wang et al. | |
| 2008/0282833 A1* | 11/2008 | Chaumet | 74/5 R |
| 2008/0314144 A1 | 12/2008 | Blomqvist | |
| 2009/0031806 A1 | 2/2009 | Hartmann et al. | |

FOREIGN PATENT DOCUMENTS

| | | |
|---|---|---|
| WO | 2005/017445 A2 | 2/2005 |
| WO | 2006/070059 A1 | 7/2006 |
| WO | 2009/119470 A1 | 10/2009 |

OTHER PUBLICATIONS

Non-Final Office Action; dated Apr. 23, 2012; Issued in Corresponding U.S. Appl. No. 12/715,803.

Taiwanese Office Action dated May 23, 2014, issued in corresponding Taiwanese Patent Application No. 099106035, 5 pages.

Final Office Action dated Aug. 7, 2014, issued in copending U.S. Appl. No. 12/715,803.

* cited by examiner

VIBRATING MICRO-MECHANICAL SENSOR OF ANGULAR VELOCITY

FIELD OF THE INVENTION

The invention relates to measuring devices used for the measuring of angular velocity, and, more precisely, to vibrating micro-mechanical sensors of angular velocity. The object of the invention is to provide an improved sensor structure enabling reliable measuring with good efficiency particularly in small vibrating micro-mechanical angular velocity sensor solutions.

BACKGROUND OF THE INVENTION

Measuring based on a vibrating sensor of angular velocity has proved to be a method of measuring angular velocity having a simple concept and being reliable. In a vibrating sensor of angular velocity, a certain known primary motion is produced and it is maintained in the sensor. The motion desired to be measured with the sensor is then detected as a deviation of the primary motion.

Central features required of sensors of angular velocity are resistance to shaking and impact. Particularly in demanding applications, such as e.g. driving control systems in the car industry, these requirements are extremely tight. Even a sharp blow, like for instance an external impact caused by a stone, or the vibration caused by a car stereo should not influence the output of the sensor of angular velocity.

The principle of operation of vibrating sensors of angular velocity most often used is the so called tuning fork principle. In the tuning fork principle the primary motion is a vibration of two linear resonators vibrating in opposite phase on a common axis. An external angular velocity affecting the sensor in a direction perpendicular to the direction of motion of the resonators causes Coriolis forces influencing the masses in opposite directions.

A Coriolis force proportional to the angular velocity is detected either directly from the masses, or the masses are connected on the same rotational axis, whereby the detection motion is angular vibration in the direction of the angular velocity axis. The angular vibration to be detected is, however, susceptible to external mechanical interference.

Inevitably, from impact events and vibrations, instances of angular acceleration, due to vibrations of the material and the substructure, are generated also to the detection axis of the sensor of angular velocity. Then the motion of the detection resonator is disturbed and deviations are caused to the output signal of the sensor of angular velocity, particularly when the frequency of the interference is close to the operating frequency of the sensor.

Several sensor solutions of prior art have been presented in order to compensate for interference signals. Such a sensor has often been made by using so called differential detection, whereby a sensor structure can be achieved, which is considerably less insensitive to external mechanical interference. One such prior art sensor solution, for example, is described in the U.S. Pat. No. 6,705,164, wherein two seismic masses, positioned alongside each other, are linearly vibrating in opposite phases in the surface plane and in the same direction. Thus, the detection resonator axis is common for both masses and perpendicular to the primary motion.

In differential detection, a common axis of motion for the centers of gravity of the detection resonators provides optimal insensitivity to external mechanical disturbance. Differential detection with two masses cancels external linear accelerations and, in the special case of a common detection axis, also instances of angular acceleration, since the sensitivity to angular acceleration of a traditional tuning fork gyro is proportional to the distance between the detection resonators axes.

Thus, this implementation of a sensor of angular velocity according to the so called reversed tuning fork principle operates significantly more reliably in shaking conditions in comparison with e.g. a traditional tuning fork. However, the greatest weakness of the reversed tuning fork principle is the primary motion's susceptibility to external disturbances.

In the structure according to the U.S. Pat. No. 6,705,164 mentioned above, the coupled linear resonators are more easily mobile in a common phase than in opposite phase. Then, the linear acceleration along the primary axis can fairly easily disturb the operation of the sensor, since the masses are physically displaced, although the differential detection of them to a major extent mitigates the thereby caused signal.

A better solution than the differential detection for compensation of mechanical disturbances is the so called dual differential detection. Such a prior art sensor solution is i.a. described in the U.S. Pat. No. 6,122,961, wherein, in FIG. 3, a dual differential tuning fork structure is presented, which structure also includes the reverse tuning fork operating principle with parallel masses presented above.

In the U.S. Pat. No. 6,122,961, four masses are coupled together into a dual differential tuning fork structure, in which two pairs of differential masses according to the tuning fork are vibrating in opposite phase in parallel. This prior art structure thus contains two opposite phase reversed tuning forks.

The dual differential tuning fork is, in fact, the most reliable angular velocity sensor structure based on linear motion in one plane. Its greatest weakness is, however, an extremely complicated and bulky spring structure. The excitation structures are also difficult to design and they also take a lot of space.

Another significant challenge in designing a good sensor of angular velocity is the capacitive crosstalk of electrostatic drive, particularly into Coriolis detection. The drive signal of the primary motion is in phase with the speed of the masses, and then the crosstalk signal is most often observed precisely in phase with the Coriolis signal. This causes a disturbance in the value of the zero point of the sensor dependent on the amplitude of the drive signal, which causes an error dependent on i.a. the temperature.

A conventional solution to this problem is the so called carrier detection. In carrier detection an AC voltage, i.e. a carrier wave, is applied across a capacitance to be measured. In this arrangement, the variable capacitance is made to modulate the amplitude of the output signal of a preamplifier, and a voltage dependent on the capacitance is obtained by demodulating with the carrier. Then the interference signal caused by capacitive crosstalk will be modulated away from the signal band at the carrier frequency.

However, carrier detection complicates the already quite complicated electronics of the sensor of angular velocity, which then contributes to increasing cost and size of the electronics and impairs its reliability. It is actually worthwhile to design the capacitive sensor element in such a way, that crosstalk of the drive signal caused by stray capacitances will cancel out as thoroughly as possible in differential Coriolis detection.

The objective of the invention is, indeed, to achieve a structure of a vibrating sensor of angular velocity suitable for a small size, and being resistant to interference, by means of which angular velocity perpendicular to the surface plane can be measured in a reliable manner.

SUMMARY OF THE INVENTION

The objective of the invention is to provide such an improved vibrating sensor of angular velocity, which enables measuring, reliably and with good performance, of angular velocity perpendicular to the surface plane, particularly in solutions of small vibrating sensors of angular velocity, and which, in comparison with prior art solutions with two masses, is remarkably much less sensitive to mechanical interference.

According to the invention, a vibrating micro-mechanical sensor of angular velocity is provided, which comprises at least two seismic mass structures such, that the sensor of angular velocity additionally comprises excitation structures and coupling seesaw type springs in such a way, that said at least two seismic mass structures are positioned apart and are supported to the excitation structures by means of springs such, that said excitation structures are supported to anchoring points at least at one of their ends by means of the coupling seesaw type springs.

Preferably, said seesaw type springs are arranged such, that the stiff support structure of the spring is allowed to turn in the surface plane about a fixed axis. Preferably, said seesaw type springs are arranged such, that the springs force the excitation structures comprising said at least two seismic mass structures into vibration in the surface plane in opposite phases. Preferably, the paths of motion of the vibration in opposite phases of said excitation structures form two parallel arcs in opposite directions.

Preferably, the sensor of angular velocity further comprises excitation comb structures positioned between the excitation structures comprising said at least two seismic mass structures. Preferably, said excitation comb structures are supported to a centrally located anchoring structure.

Preferably, the sensor of angular velocity further comprises quadrature motion compensating comb structures positioned between the excitation structures comprising said at least two seismic mass structures. Preferably, the sensor of angular velocity further comprises detection comb structures, which detection comb structures are adapted to differential detection of the primary motion. Preferably, the sensor of angular velocity further comprises Coriolis detection comb structures, which detection comb structures are adapted to dual differential detection of the Coriolis motion caused by angular velocity.

BRIEF DESCRIPTION OF THE DRAWINGS

Below, the invention and preferable embodiments thereof are described in detail with exemplifying reference to the accompanying figures, of which.

DETAILED DESCRIPTION OF THE INVENTION

Figure 1:
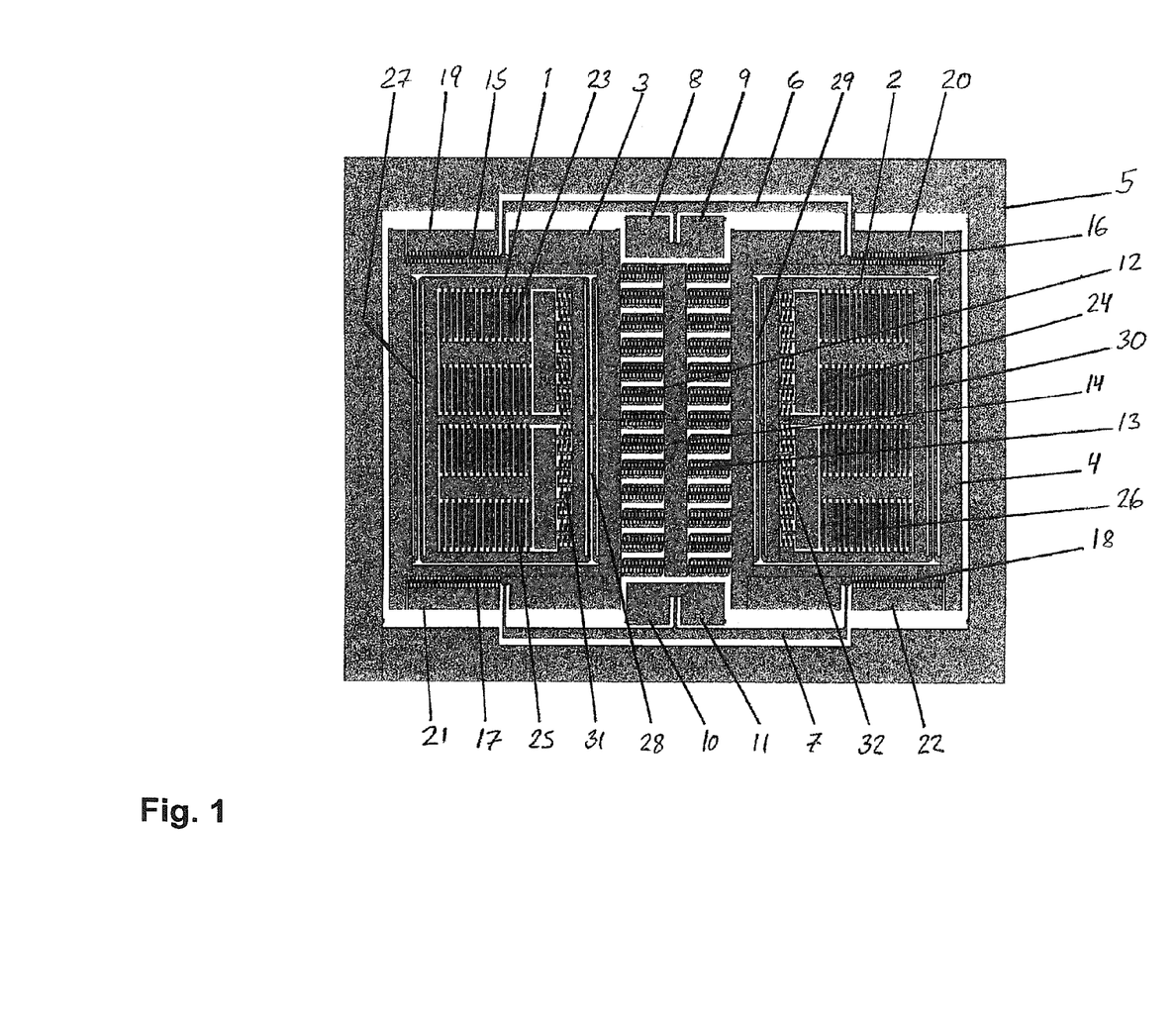
FIG. 1 shows a diagram of the functional structure of a vibrating micro-mechanical sensor of angular velocity according to the invention.

FIG. 1 shows a diagram of the functional structure of a vibrating micro-mechanical sensor of angular velocity according to the invention. The depicted vibrating micro-mechanical sensor of angular velocity according to the invention comprises two mass structures 1, 2 positioned apart, which mass structures 1, 2 are supported to excitation structures 3, 4 by means of springs 27-30. Said excitation structures 3, 4 are supported by means of coupling seesaw type springs 6, 7 to anchoring points 8-11 of a frame 5 bordering the sensor.

The vibrating micro-mechanical sensor of angular velocity according to the invention further comprises capacitive comb structures 23-26 supported to the seismic masses 1, 2, and excitation comb structures 12, 13 connected to the excitation structures 3, 4. Said excitation comb structures 12, 13 are positioned between the excitation structures 3, 4 comprising the mass structures 1, 2, and said excitation comb structures 12, 13 are supported to a centrally located anchoring structure 14.

The vibrating micro-mechanical sensor of angular velocity according to the invention further comprises capacitive excitation motion detecting comb structures 15, 16, 17, 18 supported to anchoring points 19, 20, 21, 22, and quadrature motion compensation comb structures 31, 32.

In the vibrating micro-mechanical sensor of angular velocity according to the invention, the primary motion is excited electrostatically by the opposite excitation comb structures 12, 13 by means of a common mode signal, and it is differentially detected by the detection comb structures.

The vibrating micro-mechanical sensor of angular velocity according to the invention comprises two seismic mass structures 1, 2 positioned apart, which mass structures 1, 2 are suspended by means of the excitation structures 3, 4 and the coupling springs 6, 7 to anchoring points 8-11 fastened to the cover and/or bottom of the sensor.

The coupling springs 6, 7 according to the invention are designed such, that the stiff support structure is allowed to turn in the surface plane about a fixed axis. Thus, the primary motion suspension 6, 7 forces the excitations 3, 4 of the seismic masses 1, 2 into vibration in opposite phases in the surface plane. The motion paths of the excitations 3, 4 form two parallel arcs in opposite directions.

In the vibrating micro-mechanical sensor of angular velocity according to the invention, the seismic masses 1, 2 are suspended to the excitations 3, 4 such, that the suspension 27-30 enables a deviation in the surface plane from the primary motion of the mass, caused by a Coriolis force. The deviation can be detected by the detection comb structures 15-18, which detect the deviation in the surface plane in opposite directions of the masses 1, 2, in a direction perpendicular to the excitation direction.

Figure 2:
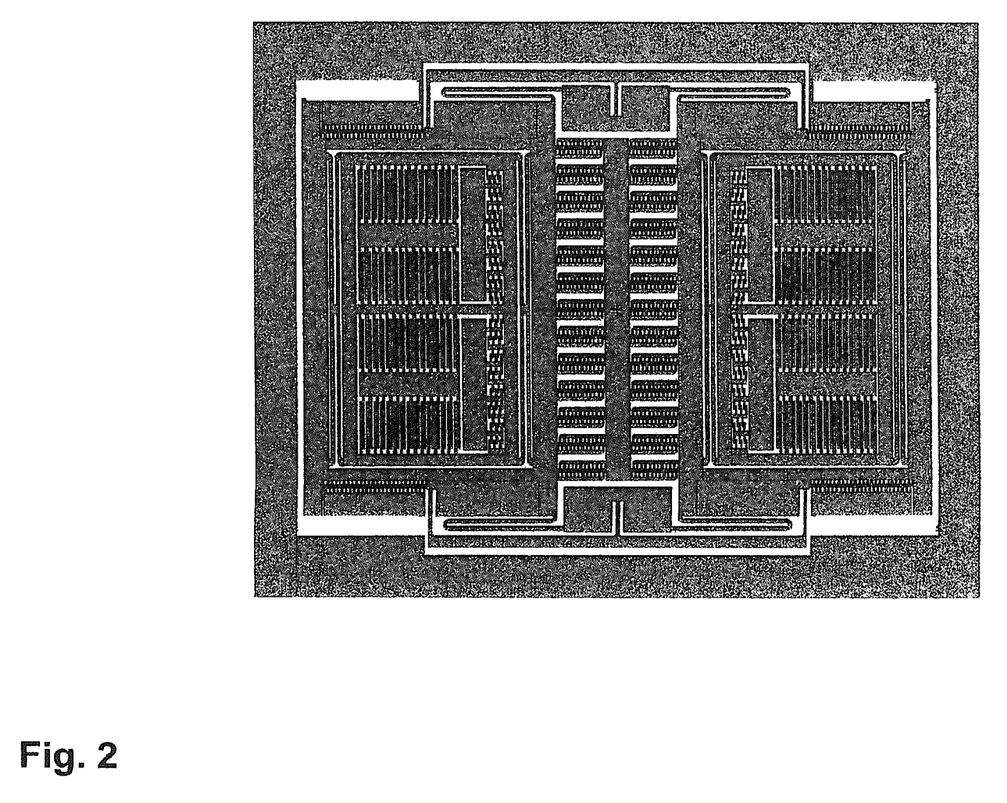
FIG. 2 shows a diagram of an alternative functional structure of a vibrating micro-mechanical sensor of angular velocity according to the invention.

FIG. 2 shows a diagram of an alternative functional structure of the vibrating micro-mechanical sensor of angular velocity according to the invention. The depicted alternative vibrating micro-mechanical sensor of angular velocity according to the invention comprises two mass structures positioned apart, which mass structures are supported to excitation structures by means of springs. Said excitation structures are supported to the sensor's anchoring points by means of coupling seesaw type springs. The alternative vibrating micro-mechanical sensor of angular velocity according to the invention comprises capacitive comb structures supported to the excitation structures and excitation comb structures connected to the excitation structures. Said excitation comb structures are positioned between the excitation structures comprising the mass structures, and said excitation comb structures are supported to a centrally located anchoring structure. The alternative vibrating micro-mechanical sensor of angular velocity according to the invention comprises capacitive excitation motion detection comb structures and quadrature motion compensation comb structures.

In the alternative vibrating micro-mechanical sensor of angular velocity according to the invention, in addition to the coupling springs, the excitation structures are supported to the sensor's anchoring points by means of primary motion dimensioning springs.

In the alternative vibrating micro-mechanical sensor of angular velocity according to the invention, the suspension of the excitation structures can be strengthened and the resonance frequency and the radius of curvature of the primary motion can be adjusted by means of the separate primary motion dimensioning springs.

Figure 3:
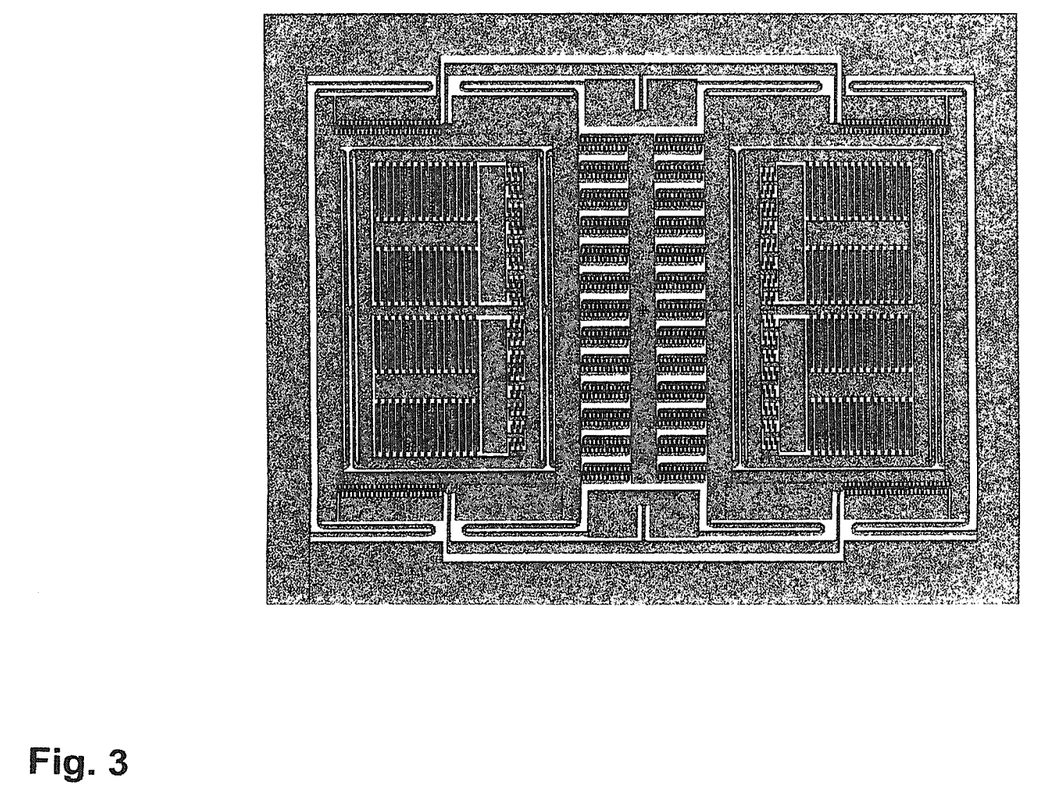
FIG. 3 shows a diagram of a second alternative functional structure of a vibrating micro-mechanical sensor of angular velocity according to the invention.

FIG. 3 shows a diagram of a second alternative functional structure of a vibrating micro-mechanical sensor of angular velocity according to the invention. The depicted second alternative vibrating micro-mechanical sensor of angular velocity according to the invention comprises two mass structures positioned apart, which mass structures are supported to excitation structures by means of springs. Said excitation structures are supported to the sensor's anchoring points by means of coupling seesaw type springs. The second alternative vibrating micro-mechanical sensor of angular velocity according to the invention comprises capacitive comb structures supported to the excitation structures and excitation comb structures connected to the excitation structures. Said excitation comb structures are positioned between the excitation structures comprising the mass structures, and said excitation comb structures are supported to a centrally located anchoring structure. The second alternative vibrating micro-mechanical sensor of angular velocity according to the invention comprises capacitive excitation motion detection comb structures and quadrature motion compensation comb structures.

In the second alternative vibrating micro-mechanical sensor of angular velocity according to the invention, in addition to the coupling springs, the excitation structures are supported to the sensor's anchoring points by means of primary motion dimensioning springs, and also, by means of second primary motion dimensioning springs, to the frame 5 bordering the sensor component.

In the second alternative vibrating micro-mechanical sensor of angular velocity according to the invention, the suspension of the excitation structures can be strengthened and the resonance frequency and the radius of curvature of the primary motion can be adjusted by means of the separate primary motion dimensioning springs.

In the second alternative vibrating micro-mechanical sensor of angular velocity according to the invention, the excitations are suspended, in addition to the coupling springs, at all four corners by means of the primary motion dimensioning springs, which increase the radius of curvature of the primary motion to become almost infinite and thus limit its motion to become essentially linear in the surface plane.

Figure 4:
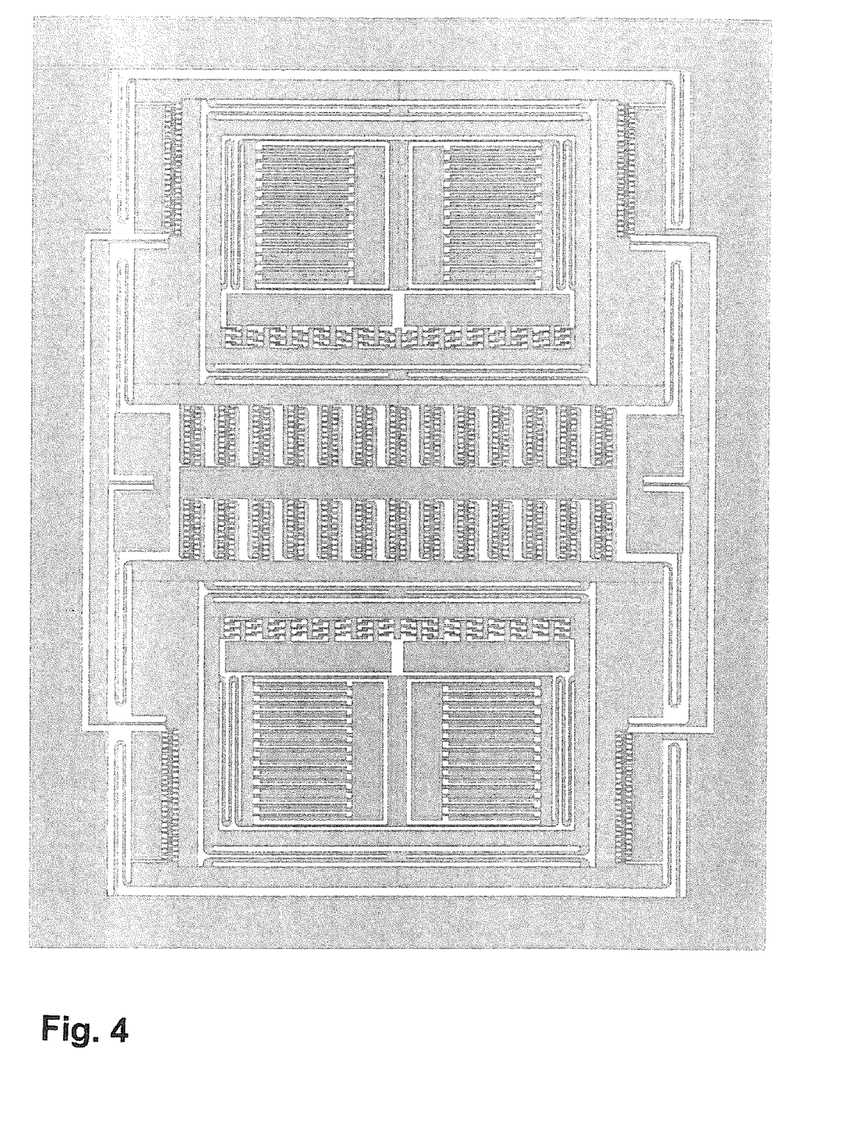
FIG. 4 shows a diagram of a third alternative functional structure of a vibrating micro-mechanical sensor of angular velocity according to the invention.
Figure 5:
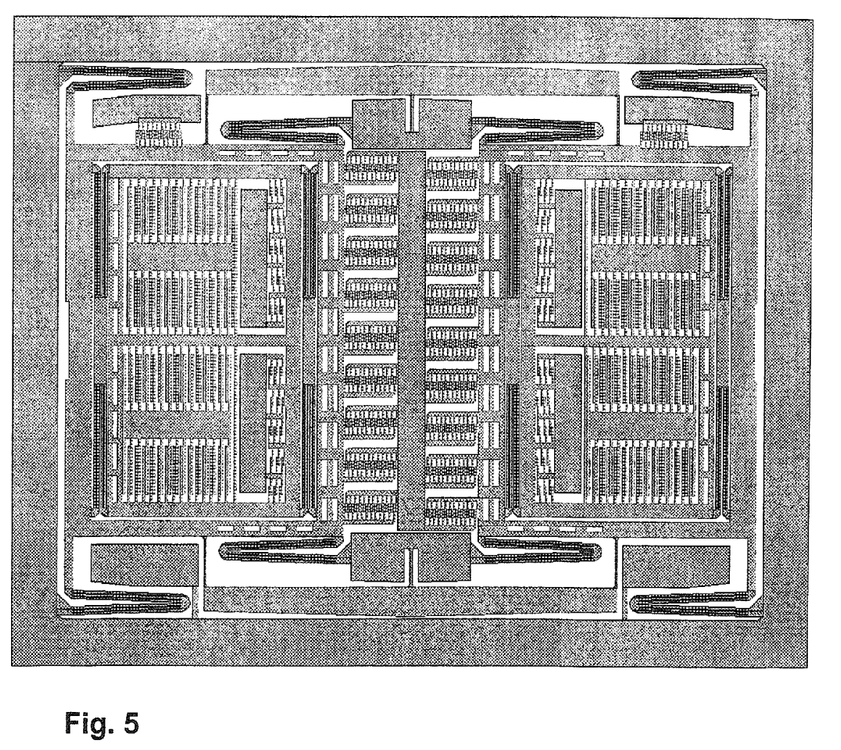
FIG. 5 shows an example of an embodiment without a secondary coupling in detail.

FIG. 4 shows a diagram of a third alternative functional structure of a vibrating micro-mechanical sensor of angular velocity according to the invention. The depicted third alternative vibrating micro-mechanical sensor of angular velocity according to the invention comprises two mass structures positioned apart, which mass structures are supported to excitation structures by means of springs. Said excitation structures are supported to the sensor's anchoring points by means of coupling seesaw type springs. The third alternative vibrating micro-mechanical sensor of angular velocity according to the invention comprises capacitive comb structures supported to the excitation structures and excitation comb structures connected to the excitation structures. Said excitation comb structures are positioned between the excitation structures comprising the mass structures, and said excitation comb structures are supported to a centrally located anchoring structure. The third alternative vibrating micro-mechanical sensor of angular velocity according to the invention comprises capacitive excitation motion detection comb structures and quadrature motion compensation comb structures.

In the third alternative vibrating micro-mechanical sensor of angular velocity according to the invention, in addition to the coupling springs, the excitation structures are supported to the sensor's anchoring points by means of primary motion dimensioning springs and also to the frame of the sensor component at anchoring points by means of second primary motion dimensioning springs. In the third alternative vibrating micro-mechanical sensor of angular velocity according to the invention, the suspension of the excitation structures can be strengthened and the resonance frequency and the radius of curvature of the primary motion can be adjusted by means of the separate primary motion dimensioning springs.

In the third alternative vibrating micro-mechanical sensor of angular velocity according to the invention, the excitations are suspended, in addition to the coupling springs, at all four corners by means of the primary motion dimensioning springs, which increase the radius of curvature of the primary motion to become almost infinite and thus limit its motion to become essentially linear in the surface plane.

In the third alternative vibrating micro-mechanical sensor of angular velocity according to the invention, the dual differential detection comb structures are further supported to the excitation structures by means of spring structures.

In the solution according to the invention, a primary motion excitation structure with one end is positioned between the masses. In the solution according to the invention, further, the Coriolis force detection structures are differential and they are located symmetrically on both sides of the sensor component far away from the excitation structures and they are fastened to the frame of the sensor component on its both sides, as close together as possible. Additionally, the quadrature signal compensation structures are positioned between the excitation structure and the detection structures as symmetrically as possible. Thus, there will be as little as possible of excitation signal crosstalk into the detection, caused by stray capacitances, and additionally it will be cancelled out in differential listening.

According to an embodiment the sensor structure comprises a common-mode drive combs structure attached to a drive structure between masses. According to an embodiment of the invention the sensor structure comprises a symmetric double-differential sense combs within masses. According to an embodiment of the invention According to an embodiment of the invention the excitation structure is implemented by a frame as an excitation frame structure. According to such an embodiment the structure comprises a closed frame structure.

In addition to the described exemplifying structures, within the scope of the invention a multitude of modifications can be presented of the sensor of angular velocity with two axes according to the invention.

We claim:

1. A vibrating micro-mechanical sensor of angular velocity comprising:
   a plurality of anchor points;
   at least two excitation structures connected to and supported by first springs connected to the anchor points, wherein at least one of the first springs is a coupling seesaw type spring that couples the at least two excitation structures with a stiff support structure configured to rotate in a surface plane about a fixed axis that is perpendicular to the surface plane; and at least two seismic mass structures positioned apart from each other and connected to and suspended by the excitation structures via a plurality of second springs, wherein the stiff support structure is configured to force the excitation structures into opposite phase vibration in the surface plane, and wherein paths of motion of the excitation structures while in the opposite phase vibration form two parallel arcs or lines in opposite directions side by side in the surface plane.

2. The sensor of claim 1, further comprising excitation comb structures positioned between the excitation structures.

3. The sensor of claim 2, wherein the excitation comb structures are supported by an anchoring structure located at a center of the sensor.

4. The sensor of claim 1, further comprising quadrature motion compensation comb structures positioned between the excitation structures.

5. The sensor of claim 1, further comprising detection comb structures configured to perform dual differential detection of Coriolis forces caused by angular velocity.

* * * * *